United States Patent [19]
Kim

[11] Patent Number: 5,221,979
[45] Date of Patent: Jun. 22, 1993

[54] PLASMA ADDRESSED LIQUID CRYSTAL DISPLAY AND MANUFACTURING METHOD

[75] Inventor: Dae-il Kim, Kyunggi, Rep. of Korea

[73] Assignee: Samsung Electron Devices Co., Ltd., Kyunggi, Rep. of Korea

[21] Appl. No.: 864,791

[22] Filed: Apr. 7, 1992

[30] Foreign Application Priority Data

Oct. 29, 1991 [KR] Rep. of Korea .................. 91-19087

[51] Int. Cl.⁵ .................. G02F 1/133; G09G 1/26
[52] U.S. Cl. .................. 359/54; 359/55; 359/87; 340/771; 340/794
[58] Field of Search .................. 359/54, 55, 84, 87; 340/784, 771, 794, 781

[56] References Cited
U.S. PATENT DOCUMENTS

| | | | |
|---|---|---|---|
| 3,845,241 | 10/1974 | Schwartz | 340/781 |
| 4,339,482 | 7/1982 | Glaser et al. | 359/88 |
| 4,896,149 | 1/1990 | Buzak et al. | 340/794 |
| 5,077,553 | 12/1991 | Buzak | 340/794 |

*Primary Examiner*—William L. Sikes
*Assistant Examiner*—Huy K. Mai
*Attorney, Agent, or Firm*—Leydig, Voit & Mayer

[57] ABSTRACT

A plasma addressed liquid crystal display and manufacturing method thereof is disclosed whose plasma addressing unit has a barrier of a predetermined height between a planar orientation layer and a rear substrate, a second electrode placed in the middle or on the top of the barrier, and a first electrode positioned between the barriers. The electrodes are made of metal paste which enables the use of a screen printing method, thereby facilitating manufacturing and allowing for a large screen display.

28 Claims, 2 Drawing Sheets

PLASMA ADDRESSED LIQUID CRYSTAL DISPLAY AND MANUFACTURING METHOD

BACKGROUND OF THE INVENTION

The present invention relates to a plasma addressed liquid crystal display (LCD) and the manufacturing method thereof, and more particularly to a plasma addressed LCD having an improved plasma addressing unit and its manufacturing method.

Various types of displays include a phosphor display tube using a low-speed electron beam, a plasma display using gas discharge, an electroluminescence (EL) display using the electro-luminescence effect, an electro-optical liquid crystal display (LCD), as well as a traditional cathode ray tube using a high-speed electron beam. These various displays are selectively adapted according to their characteristics since they have different functions and structures. Their common purpose is to visualize an electrical image or data signal. The displays have been developed structurally and functionally in their respective fields.

Recently, a matrix-type display compositely constructed with the plasma discharge device and electro-optical device, that is, an LCD is disclosed in U.S. Pat. No. 4,896,149 by Tektronix.

The display is to address individual line by way of a plasma discharge which is shown in FIG. 1. Referring to FIG. 1, the display is constructed such that a liquid crystal shutter 10 in which a plurality of striped data electrodes 14 are arranged in parallel, is overlapped with a plasma addressing unit 20 in which a plurality of scanning lines 21 are arranged at right angles to striped data electrodes 14 of liquid crystal shutter 10. A background light generator 30 usually formed with an EL display is provided to the rear of the plasma addressing unit.

Referring to FIG. 2, liquid crystal shutter 10 has first and second transparent substrates 12 and 13 between which liquid crystal 16 is filled. Striped data electrodes 14 are formed on the inner side of first substrate 12. Among these two substrates, second substrate 13 has a relatively thin thickness of 50μm and plays an important role in the orientation of liquid crystal. Plasma addressing unit 20 has a plurality of grooves 24 which form scanning lines 21 on a third substrate 25 perpendicular to the striped data electrodes. A pair of electrodes 22 and 23 are provided in parallel on either side of the bottom of each groove 24. In this configuration, third substrate 25 is adhesively fixed with second substrate 13 of liquid crystal shutter 10 so that grooves 24 form a closed discharge space in which discharge gas is filled.

In liquid crystal shutter 10, since a data signal is applied to a selected data electrode 14, a potential for activating the liquid crystal is formed along a selected data electrode 14. In plasma addressing unit 20, according to the ionized state of each discharge line due to the plasma discharge of each sequentially-selected plasma scanning line 21, a positive potential for activating the liquid crystal 16 is formed linearly along scanning line 21 on second substrate 13 in contact with the liquid crystal. Accordingly, a potential difference is formed by a selected data electrode 14 of liquid crystal shutter 10 and scanning line 21 of plasma addressing unit 20. Liquid crystal positioned at the intersection is activated and oriented by the potential difference at the interconnection, which forms a light passing dotted area through which light from the rear ward back light generator passes.

In other words, in plasma addressing unit 20, when voltage of a predetermined potential is applied to a pair of parallel electrodes 22 and 23 on a sequentially selected scanning line, linear direct-current-discharge occurs between parallel electrodes 22 and 23. Due to this, a linear potential is formed along scanning line 21 on the thinner second substrate 13. When the linear potential is formed on second substrate 13 by the linear discharge on scanning line 21 selected by the scanning signal, a data signal is selectively applied to data electrode 14 of the upper liquid crystal shutter 10. When liquid crystal is then activated by the potential difference at the intersection of the selected data electrode 14 and the selected and discharged scanning line 21 and is locally re-arranged, back light passes, forming one picture point.

The display is a unique flat-panel display which orients the liquid crystal by the data electrodes and scanning lines. Its drawback is that as described above, since the addressing unit requires, as its structural base, grooves 24 formed on the third substrate and a pair of electrodes 12 and 13 formed on the bottom of third substrate 25, the manufacture of the display is very elaborate. In other words, to form grooves 24 on third substrate 25, complicated etching process is required. Especially, forming a pair of electrodes on the bottom of each groove requires more than a simple silk screen printing method; a photolithography method including a metal deposition is needed. Such a technique to form a groove on glass, followed by an electrode formed thereon, is very complicated, especially for a large-screen display.

SUMMARY OF THE INVENTION

Therefore, it is an object of the present invention to provide a plasma addressed liquid crystal display which allows for a large display and facilitates manufacturing.

It is another object of the present invention to provide a method for manufacturing the above plasma addressed liquid crystal display.

To accomplish the objects, the plasma addressed liquid crystal display comprises first and second substrates filled with liquid crystal therebetween, a plurality of striped data electrodes formed on the inner side of the first substrate, a third substrate opposing the outer side of the second substrate, a plurality of striped first electrodes placed on the inner side of the third substrate opposing the second substrate at right angles to the data electrodes, a barrier of a predetermined height disposed between the first electrodes and parallel thereto, and a second electrode stacked with each barrier, the flanks of the second electrode facing the first electrodes positioned adjacent to a corresponding barrier.

In one LCD, the second electrode is placed in the middle of the barrier which is divided into upper and lower parts. In another embodiment, the second electrode is provided on the top of the barrier to make contact with the bottom of the second substrate so that the barrier and second electrode are stacked as two separate bodies.

Further, when the second electrode is formed in the middle of the barrier, one or both of the flanks of the second electrode is exposed.

In a plasma addressed liquid crystal display including first and second substrates filled with liquid crystal therebetween, a plurality of striped data electrodes formed on the inner side of the first substrate, a third substrate opposing the outer side of the second substrate, a plurality of striped first electrodes placed in parallel on the inner side of the third substrate opposing the second substrate at right angles to the data electrodes, a barrier of a predetermined height disposed between the first electrodes and in parallel thereto, and a second electrode stacked with each barrier, the flanks of the second electrode facing the first electrodes positioned adjacent to a corresponding barrier, a method of manufacturing the plasma addressed liquid crystal display comprises the steps of forming in parallel the first electrodes on the third substrate, forming between the first electrodes the barrier of a predetermined height where the second electrode is stacked, adhering the third substrate and second substrate of a predetermined thickness with paste while interposing the barrier, coupling onto the top of the second substrate and separated by a predetermined distance, the first substrate where the data electrodes are formed in advance, and sealing after filling liquid crystal between the first and second substrates.

In the method of manufacturing the plasma addressed liquid crystal display, during the step of forming the barrier stacked with the second electrode, the barrier is constructed such that after a lower part of the barrier is formed, the second electrode is formed thereon, and an upper part of the barrier is formed on the second electrode.

In another embodiment of the present invention, during the step of forming the barrier stacked with the second electrode, after the barrier is formed, the second electrode is formed on the top thereof.

During the step of adhering the second and third substrates, after paste is coated on the top of the barrier to a predetermined thickness, the second substrate is fixed on the barrier and baked by a predetermined process.

During the step of baking the paste, to apply a shock absorbing characteristic to the paste, the paste is heated at the temperature where the paste exists in the form of a gel.

BRIEF DESCRIPTION OF THE DRAWINGS

The above objects and other advantages of the present invention will become more apparent by describing in detail a preferred embodiment of the present invention with reference to the attached drawings in which.

DETAILED DESCRIPTION OF THE INVENTION

Figure 1:
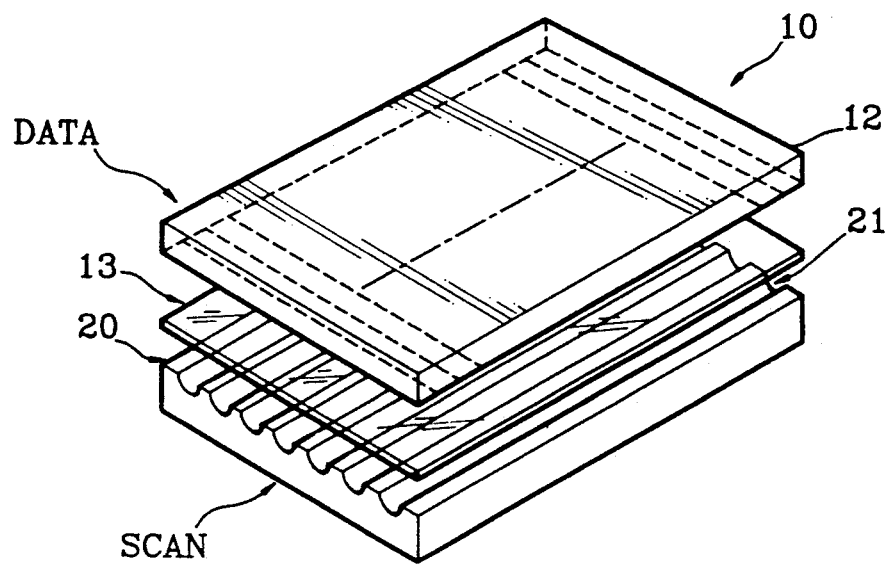
FIG. 1 is an exploded perspective view which schematically shows a conventional plasma addressed liquid crystal display.
Figure 2:
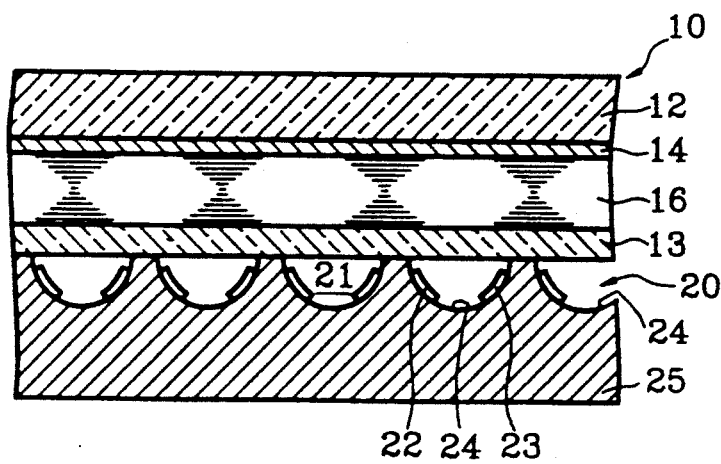
FIG. 2 is a partially-enlarged extracted sectional view of the conventional plasma addressed liquid crystal display shown in FIG. 1.
Figure 3:
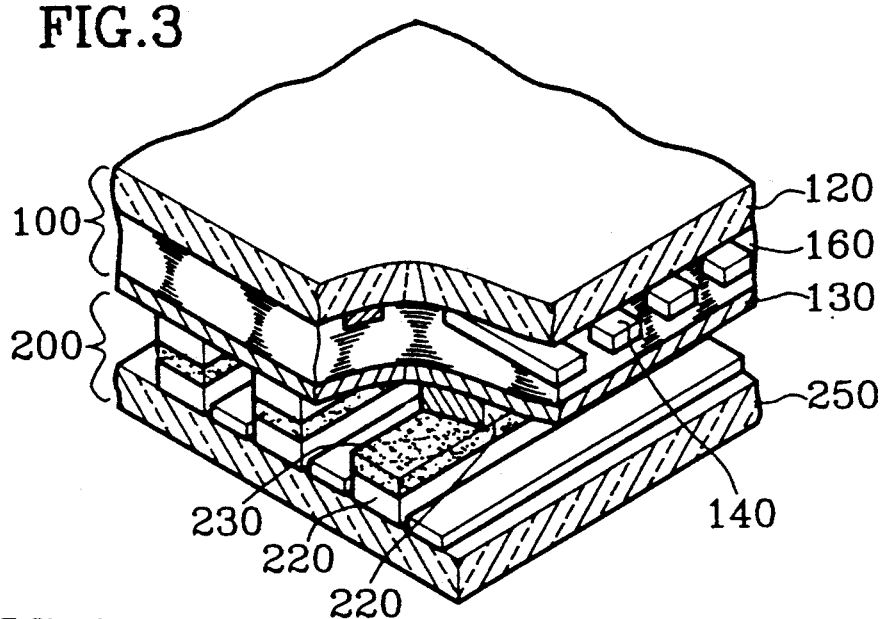
FIG. 3 is a schematic perspective view of a plasma addressed liquid crystal display of the present invention.
Figure 4:
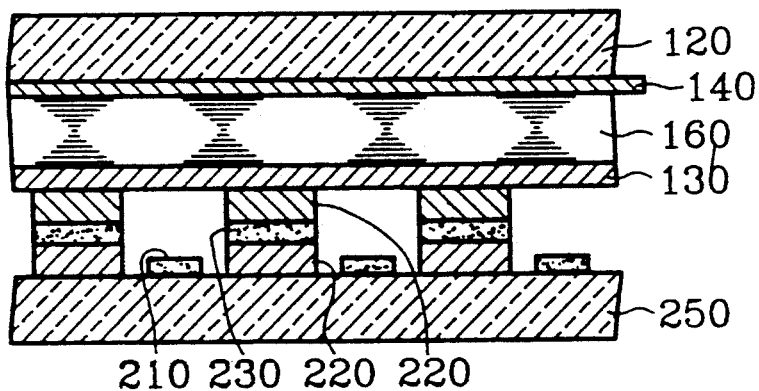
FIG. 4 is a schematic sectional view of the plasma addressed liquid crystal display of the present invention.

Referring to FIGS. 3 and 4, the liquid crystal display of the present invention is divided into a liquid crystal shutter 100 and a plasma addressing unit 200. Transparent first and third substrates 120 and 250 are positioned at a distance apart to protect a later-mentioned functional layer placed therebetween. A plurality of striped transparent data electrodes 140 are formed in parallel on first substrate 120. A layer 160 and a second substrate 130 are subsequently provided to the first substrate. The second substrate 130 has a thickness of 50μm and a predetermined dielectric constant.

As shown in FIG. 4, a plurality of barriers 220 (shown in this embodiment as being separated into upper and lower bodies) having a predetermined height and stacked with a striped second electrode 230 are provided on the opposite side of liquid crystal layer 160 with second substrate 130 placed therebetween. A first electrode 210 is provided parallel with the second electrode between the barriers and on the inner surface of third substrate 250. Preferably, the second electrode 230 has both flanks completely exposed. However, it may have only one exposed flank.

In the above structure, barrier 220, first and second electrodes 210 and 230 run perpendicular to the data electrodes formed on the first substrate, while the flank of first electrode 210 faces the flank of second electrode 230 which is placed between upper and lower bodies of barrier 220 and positioned adjacent to the first electrode.

In the structural feature of the plasma addressing unit of the LCD of the present invention, three electrodes are exposed to one linear discharge space. Since this represents one too many electrodes with respect to the basic number of two discharge electrodes, the discharge electrodes can be selected according to their driving methods. However, since there are two types of electrodes in the linear discharge space, one may be the cathode and the other the anode. Here, for efficient discharge, it is desirable that the first electrode placed between barriers be used as the cathode and the second electrode put between the upper and lower barriers as the anode. It is also desirable that the data electrode is formed of Indium-Tin-Oxide (ITO) for its transparency and the first and second electrodes be formed of metal, preferably nickel paste. Although the first electrode is preferably formed of ITO so as to allow the passage of background light, in the present invention, the first electrode may be formed of metal paste by considerably reducing its width in order to maximize the passage of background light. The electrodes are made by a screen printing method so that the first electrode is separately formed first, then the second electrode is formed during or after forming the barrier. In forming the first electrode out of ITO, deposition or photolithography are usually used.

Figure 5:
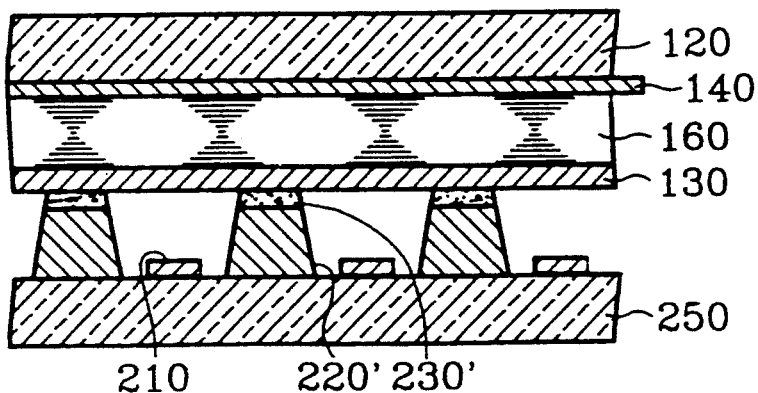
FIG. 5 is a sectional view of another embodiment of the liquid crystal display of the present invention.

Meanwhile, in FIG. 5 illustrating another embodiment of the present invention, a second electrode 230' is placed on the top of a unified barrier 220' and makes contact with the bottom of second substrate 130. Ordinary liquefied liquid crystal is preferably used as the liquid crystal, but polymer-dispersed liquid crystal with a rapid, response and excellent manufacturing characteristics is also desirable.

In any form, the barriers 220 function as a spacer keeping a predetermined distance between second and third substrates 130 and 250 between which discharge gas is filled. Second substrate 130 isolates liquid crystal layer 160 from the discharge space, and during discharge, orients the liquid crystal due to its dielectric characteristic.

A driving method of the LCD of the present invention is similar to the conventional one. A data signal is applied to the data electrode of the liquid crystal shutter, and voltage of a predetermined potential, i.e., a scanning signal, is applied to selected first and second electrodes of the plasma addressing unit. This creates a discharge which forms an electrical field in the liquid crystal in the direction of the discharge line. The liquid crystal is activated to be oriented in one direction at the interconnection of the data electrode where data is written. In moving the discharge to a next scan line, new first and second electrodes are selected and pulsed voltage is applied thereto to create a next discharge.

Different from the conventional method, the barriers of the present invention may be formed by the screen printing method as described above. According to the conventional manufacturing method, since each barrier has a different height, the barriers may have irregular gaps with the very thin second substrate, which creates abnormalities in an image and crosstalk between scan lines during discharge. These can be simply solved by the manufacturing method of the liquid crystal display of the present invention described below in detail.

First, after a plurality of the striped transparent first electrodes are formed in parallel on the third substrate, the barriers of a predetermined height are formed between the transparent first electrodes. The second electrodes are formed on the top of the barriers by a printing method. When the second electrode is formed between the upper and lower bodies of the barrier as is the case shown in FIG. 4, another barrier body is formed on the second electrode. After this process, baking is carried out at a predetermined temperature, for example, 580° C., for ten minutes in a furnace.

After baking, paste is thinly coated to a predetermined thickness either on the top of the barrier or on the second electrode, by deposition. The second substrate of 50μm is placed on the paste-coated surface and slightly compressed to have a uniform adhesion state. The cohesive body is heated at a temperature below the freezing point of the paste, that is, at a temperature where the paste exists in a gel state. Suitable pastes include #D-4057 and #D-4058 of ESL company which gel at around 480° C. Therefore, gelled adhesive components are obtained when the heating temperature is 480° C. The gelled adhesive acts as an elastic buffer layer which is suitable for supporting the thin second substrate.

After this, the first substrate with the data electrode formed thereon in advance, is coupled to the top of the second substrate and separated therefrom by a predetermined distance, with the space being filled with liquid crystal to form a seal. These constitute the preliminary construction steps which require subsequent completion.

According to the present invention, the problem of the gap between the second substrate and barrier is settled. In its structure, the present invention facilitates manufacturing and can use the conventional silk screen printing method in forming the barrier, and particularly in forming the electrode of the plasma addressing unit, thereby realizing a large screen.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A plasma addressed liquid crystal display comprising:
   first and second substrates filled with liquid crystal therebetween;
   a plurality of striped data electrodes formed in parallel on an inner side of said first substrate;
   a third substrate opposing an outer side of said second substrate;
   a plurality of striped first electrodes placed on an inner side of said third substrate opposing said second substrate at right angles to said data electrodes;
   a barrier of a predetermined height disposed between said first electrodes and parallel thereto; and
   a second electrode stacked with each barrier, the flanks of said second electrode facing said first electrodes positioned adjacent to a corresponding barrier.

2. A plasma addressed liquid crystal display as claimed in claim 1, wherein said second electrode is provided on the top of said barrier to make contact with the bottom of said second substrate.

3. A plasma addressed liquid crystal display as claimed in claim 2, wherein at least one of said first and second electrodes is formed of metal paste.

4. A plasma addressed liquid crystal display as claimed in claim 1, wherein said barrier is divided into upper and lower parts and said second electrode is placed between the upper and lower parts of said barrier.

5. A plasma addressed liquid crystal display as claimed in claim 4, wherein at least one of said first and second electrodes is formed of metal paste.

6. A plasma addressed liquid crystal display as claimed in claim 4, wherein said second electrode has at least one exposed flank.

7. A plasma addressed liquid crystal display as claimed in claim 1, wherein at least one of said first and second electrodes is formed of metal paste.

8. A plasma addressed liquid crystal display as claimed in claim 7, wherein said liquid crystal layer is formed of liquefied liquid crystal.

9. A plasma addressed liquid crystal display as claimed in claim 7, wherein said liquid crystal layer includes polymer dispersed liquid crystal.

10. A plasma addressed liquid crystal display as claimed in claim 1, wherein said second electrode has at least one exposed flank.

11. A plasma addressed liquid crystal display as claimed in claim 10, wherein at least one of said first and second electrodes is made of metal paste.

12. A plasma addressed liquid crystal display as claimed in claim 11, wherein said liquid crystal layer is formed of liquefied crystal.

13. A plasma addressed liquid crystal display as claimed in claim 11, wherein said liquid crystal includes polymer dispersed liquid crystal.

14. In a plasma addressed liquid crystal display including first and second substrates filled with liquid crystal therebetween, a plurality of striped data electrodes formed in parallel on the inner side of said first substrate, a third substrate opposing the outer side of said second substrate, a plurality of striped first electrodes placed in parallel on the inner side of said third substrate opposing said second substrate at right angles to said data electrodes, a plurality of barriers of a predetermined height, each barrier disposed between one of said first electrodes and parallel thereto, and a second electrode stacked with each barrier, the flanks of said second electrode facing said first electrodes positioned adjacent to a corresponding barrier, a method of manufacturing said plasma addressed liquid crystal display comprising the steps of:

forming first striped transparent electrodes in parallel on the third substrate;

forming between said first electrodes an intermediate member of a predetermined height, each intermediate member including a barrier and a second electrode;

adhering the second substrate of a predetermined thickness to the intermediate members with paste;

aligning said second substrate with said first substrate so that said first and second substrates oppose each other and are spaced apart by a predetermined distance; and filling the space between said first and second substrates with liquid crystal.

15. A method of manufacturing said plasma addressed liquid crystal display as claimed in claim 14, wherein the step of forming the intermediate members includes the steps of forming a lower part of the barrier, forming the second electrode on the lower part of the barrier, and forming an upper part of the barrier on the second electrode.

16. A method of manufacturing said plasma addressed liquid crystal display as claimed in claim 15, wherein during the step of adhering the second substrate paste is coated on the top of said barrier to a predetermined thickness and the second substrate is fixed on said barrier and baked.

17. A method of manufacturing said plasma addressed liquid crystal display as claimed in claim 16, wherein during the step of baking the paste, the paste is heated at the temperature where the paste exists in the form of a gel.

18. A method of manufacturing said plasma addressed liquid crystal display as claimed in claim 14, wherein during the step of forming the intermediate members, after said barrier is formed, the second electrode is formed on the top thereof.

19. A method of manufacturing said plasma addressed liquid crystal display as claimed in claim 18, wherein during the step of adhering the second substrate to the intermediate members, paste is coated on the top of the second electrode to a predetermined thickness and the second substrate is fixed on the second electrode and baked.

20. A method of manufacturing said plasma addressed liquid crystal display as claimed in claim 19, wherein during the step of baking the paste, the paste is heated at the temperature where said paste exists in the form of a gel.

21. A method of manufacturing a plasma addressed liquid crystal display comprising the steps of:

forming a plurality of parallel striped transparent first electrodes on a first boundary substrate;

forming a plurality of barriers on the outer substrate, each barrier being adjacent to a first electrode and each barrier including an upper surface having a second electrode stacked thereon;

coating the second electrodes with an adhesive agent;

adhering a middle substrate to the second electrodes to form a cohesive body;

forming data electrodes on a second boundary substrate;

aligning the middle substrate with the second boundary substrate so that the middle substrate and the second substrate lie in parallel planes which are spaced apart from each other by a predetermined distance;

filling the space between the middle substrate and the second boundary substrate with liquid crystal.

22. A method of manufacturing a plasma addressed liquid crystal display as claimed in claim 21 further comprising the step of baking the first boundary substrate at a predetermined temperature after the barriers have been formed thereon.

23. A method of manufacturing a plasma addressed liquid crystal display as claimed in claim 21 further comprising the step of heating the cohesive body at a temperature where the adhesive agent becomes gelatinous.

24. A method of manufacturing a plasma addressed liquid crystal display as claimed in claim 21 wherein the adhesive agent is a paste.

25. A method of manufacturing a plasma addressed liquid crystal display as claimed in claim 21 further comprising the step of baking the first boundary substrate at a predetermined temperature after the barriers have been formed thereon.

26. A method of manufacturing a plasma addressed liquid crystal display as claimed in claim 21 further comprising the step of heating the cohesive body at a temperature where the adhesive agent becomes gelatinous.

27. A method of manufacturing a plasma addressed liquid crystal display as claimed in claim 21 wherein the adhesive agent is a paste.

28. A method of manufacturing a plasma addressed liquid crystal display comprising the steps of:

forming a plurality of parallel striped transparent first electrodes on a first boundary substrate;

forming a plurality of barriers on the outer substrate, each barrier being adjacent to a first electrode and each barrier having first and second portions wherein a second electrode is sandwiched between the first and second portions;

coating the plurality of barriers with an adhesive agent;

adhering a middle substrate to the second electrodes to form a cohesive body;

forming data electrodes on a second boundary substrate;

aligning the middle substrate with the second boundary substrate so that the middle substrate and the second substrate lie in parallel planes which are spaced apart from each other by a predetermined distance;

filling the space between the middle substrate and the second boundary substrate with liquid crystal.

* * * * *